US012792031B2

(12) United States Patent
Mickley et al.

(10) Patent No.: US 12,792,031 B2
(45) Date of Patent: Nov. 10, 2026

(54) PREDICTIVE MONITORING SYSTEM FOR MONITORING EQUIPMENT IN A COMMERCIAL OPERATING ENVIRONMENT

(71) Applicant: Hanford Technology Services, Geneseo, IL (US)

(72) Inventors: Jakob Mickley, Glen Ellyn, IL (US); Michael Tabb, Atlanta, GA (US)

(73) Assignee: Hanford Technology Services, Glen Ellyn, IL (US)

( * ) Notice: Subject to any disclaimer, the term of this patent is extended or adjusted under 35 U.S.C. 154(b) by 690 days.

(21) Appl. No.: 18/188,074

(22) Filed: Mar. 22, 2023

(65) Prior Publication Data

US 2024/0028025 A1 Jan. 25, 2024

Related U.S. Application Data

(60) Provisional application No. 63/269,809, filed on Mar. 23, 2022.

(51) Int. Cl.
*G05B 23/02* (2006.01)

(52) U.S. Cl.
CPC ....... *G05B 23/0283* (2013.01); *G05B 23/027* (2013.01)

(58) Field of Classification Search
CPC . G05B 23/0283; G05B 23/027; H04L 67/562; H04L 67/563; H04L 67/51; H04L 67/55; H04L 12/2825; H04L 67/125
See application file for complete search history.

(56) References Cited

U.S. PATENT DOCUMENTS

| | | | | |
|---|---|---|---|---|
| 2021/0185154 | A1 * | 6/2021 | Schelstraete | H04W 28/04 |
| 2021/0356945 | A1 * | 11/2021 | Cella | G06N 20/00 |
| 2023/0080899 | A1 * | 3/2023 | Kolhapure | H04L 41/0226 370/254 |

* cited by examiner

*Primary Examiner* — Lee E Rodak
*Assistant Examiner* — Byung Ro Lee
(74) *Attorney, Agent, or Firm* — Miller Canfield

(57) ABSTRACT

A predictive monitoring system and an integrative subsystem installed in a BACNet environment, wherein the subsystem communicates with BACNet devices and other components of the predictive monitoring system to allow the predictive monitoring system to both communicate with IoT devices and also integrate with existing BACNet devices operating on the different BACNet communications protocol. The predictive monitoring system receives data streams from all of these devices and reconciles differences in the communications protocols for subsequent use of different data streams by the predictive monitoring system.

20 Claims, 6 Drawing Sheets

PREDICTIVE MONITORING SYSTEM FOR MONITORING EQUIPMENT IN A COMMERCIAL OPERATING ENVIRONMENT

CROSS REFERENCE TO RELATED APPLICATIONS

This application claims priority of U.S. Provisional Patent Application No. 63/269,809 having a filing date of Mar. 23, 2022, the disclosure of which is incorporated by reference in its entirety.

FIELD OF THE INVENTION

The invention relates to a predictive monitoring system for monitoring equipment in a commercial operating environment, and more particularly, relates to a predictive monitoring system configured to communicate with IoT sensors and devices and adapted to communicate with BACNet devices.

BACKGROUND OF THE INVENTION

In commercial operating environments such as factories, manufacturing and industrial plants, and the like, a wide variety of commercial and industrial equipment may be used. This equipment can take many forms and exhibit different operating characteristics depending upon the type of equipment, its mode of operation, and the operating conditions in which it is used. This equipment is generally mechanical in nature and exhibits different operating characteristics such as temperature, speed, vibration, frequency, sound, power consumption or the like. During normal operation, the operating characteristics would fall in a normal range, but such equipment may undergo different types of failures and breakdowns, during which the operating characteristics can then vary in response to the failure condition.

It is known to provide such equipment with sensors that detect the operating conditions, and then monitor these operating conditions to detect failures and breakdowns of the equipment. In many known industrial environments, the data collection by the sensors may be passively monitored until the sensed operating conditions indicate that a failure or breakdown has occurred. At this time, the equipment can be shut down or may not even be operable, which thus necessitates repair or replacement of the faulty equipment. The operator might also review the operating characteristics at periodic intervals to check whether any concerning changes have occurred that might indicate failure or potential failure.

In response to drawbacks in passive monitoring of the operating conditions of such equipment, a predictive monitoring system or platform was developed by the assignee of the present invention that monitors operating conditions of a wide variety of equipment through data collection from installed sensors. The predictive monitoring system analyzes such data to proactively identify and predict equipment failures before a breakdown or catastrophic failure of the equipment to thereby facilitate repair of the equipment before the failure occurs or replacement before an upcoming failure results in secondary damage to other equipment and structures or results in breakdowns that cause operations to be halted. This predictive monitoring system thereby provides for improved industrial operations, which helps avoid costly and damaging repairs and breakdowns.

While many types of equipment may include native sensors built into the equipment, the predictive monitoring system allows for the addition of aftermarket sensors having an IoT communications capability. This widens the scope of data collection throughout a commercial operating environment to provide a more complete view of critical assets within the operating environment. Further, the data is monitored and analyzed as it is collected in real time to detect symptoms or aberrations in operating conditions as recognized in the collected data to anticipate and predict future failures or breakdowns, and trigger inspection and repair before such failures or breakdowns occur.

When installing non-native or new sensors to equipment as part of the predictive monitoring system, new IoT sensors may be placed at key areas of the equipment, such as motors and piping in the case of a pump, with the goal to collect information, understand operating behaviors of the equipment, and leverage the information with the predictive monitoring system to proactively initiate maintenance to avoid potential failures. As noted the installed sensors may be of a variety of types that detect different types of data such as temperature, vibrations, pressure, power consumption and the like. These installed sensors thereby generate a stream of data wherein the predictive monitoring system is able to monitor and differentiate one data type from another and then present results to a system operator. The predictive monitoring system interprets the data for the operator and flags data trends that deviate from normal trends and thereby are indicative of an equipment problem.

As noted, the predictive monitoring system incorporates sensors, wherein these add-on sensors are added to existing equipment in a retrofit installation. These add-on sensors communicate with the predictive monitoring system, wherein the communication protocols and data streams of the sensors integrate with the communication protocols of the predictive monitoring system.

In some cases, however, a commercial operating environment may already include an arrangement of existing sensors such as those typically provided in an installed system that is passively monitored by operators. These existing sensors may already rely upon an existing communications protocol and data stream that is different from and incompatible with another communications protocol and data stream usable with the predictive monitoring system.

In one configuration, known commercial operating environments may already have sensors configured for a BACNet system. BACNet is a known ANSI/ASHRAE standard that establishes a defined communication protocol that has been previously used in building systems to allow devices to communicate with each other using a common language. Generally, BACNet has been used to allow systems made by different companies to communicate with each other, wherein the devices would be configured to use the BACNet protocol. As such, prior to the introduction of the predictive monitoring system described above. BACNet was used as an industrial and commercial communication protocol by which existing sensors were able to communicate with other devices in industrial and commercial operations. Many of these BACNet networks remain in use in numerous commercial environments. However, the predictive monitoring system described above does not rely upon BACNet as its communications protocol, but instead relies upon a communications protocol that is used to operate IoT type sensors. The BACNet protocol and IoT protocol or other alternate protocol are not the same and work with different hardware to effect communications between system devices. Due to differences between the BACNet protocol and the IoT protocol and even other communications protocols, these different protocols are not interchangeable or compatible with each other. The BACNet network would not communicate with IoT sensors and vice versa.

It is an object of the present invention to provide an improved predictive monitoring system which can operate IoT sensors and devices and incorporate new technologies while integrating with the older BACNet protocol.

The present invention therefore relates to an improved predictive monitoring system and an integrative subsystem installed in a BACNet environment and connected to other components of the predictive monitoring system that allows the predictive monitoring system to both communicate with IoT devices as originally designed and also integrate with existing BACNet devices to receive data streams from all of these devices and reconcile the differences in the communications protocols so that the data is usable with the predictive monitoring system.

The improved predictive monitoring system or platform monitors operating conditions of a wide variety of equipment through data collection from at least a first collection of sensors. These sensors may be provided on premises in a commercial operating environments. Such sensors preferably are IoT type sensors using the IoT protocol that are installed on equipment or at other locations proximate the equipment to monitor the operating characteristics of the equipment and/or the external environment around the equipment. While the commercial operating environment may be a fixed, physical location such as a building, the commercial operating environment might also be a mobile, physical location such as a vehicle including semi-trucks, delivery vans and the like.

The predictive monitoring system also includes an edge gateway and a processing module or subsystem, which may be a cloud based computing system and may use an AWS architecture for data processing, analytics and communication of data trends and alert conditions. The gateway communicates with the processing module to transmit a data stream from each of the sensors to the processing subsystem to perform various predictive and analytic processes on such data.

The improved predictive monitoring system also has an additional gateway that may be configured for receiving data streams from a second collection of sensors, which use a disparate or different communications protocol in comparison to the first sensors referenced above. The additional gateway may be configured different from the first gateway referenced above, or the additional gateway might be configured to handle multiple communications. The additional gateway may be connected to one or more sensor types, such as a wireless or wired IoT sensor or one or more BACNet sensors.

With respect to BACNet monitoring systems, known commercial operating environments may already have sensors configured for a BACNet network or system. The predictive monitoring system does not rely upon BACNet as its communications protocol but relies upon the primary communications protocol that is used to operate IoT type sensors.

Many types of equipment may include native sensors built into the equipment, and such data may already be monitored, such as through a BACNet sensor system or network. However, since the development of BACNet years ago, the IoT communications protocol was established, and many modern devices are being marketed with IoT capability. Yet, many older equipment devices are of an age that predates IoT technology. As an advantage of the present invention, the predictive monitoring system allows for the addition of aftermarket sensors having an IoT communications capability, which may be wireless or wired. When wireless, IoT sensors such as sensors can be installed in a wide variety of fixed and mobile physical locations. The present invention widens the scope of data collection throughout a commercial operating environment to provide a more complete view of critical assets within the operating environment. Further, the present invention allows for data to be collected from both IoT sensors and existing BACNet type sensors. The differences in protocols can be reconciled by the gateway or other system components so that all of the data can be monitored and analyzed as it is collected in real time to detect aberrations in operating conditions that might indicate a potential failure. The predictive monitoring system allows operators to anticipate and predict future failures or breakdowns, and trigger inspection and repair before such failures or breakdowns occur.

Other objects and purposes of the invention, and variations thereof, will be apparent upon reading the following specification and inspecting the accompanying drawings.

Figure 1:
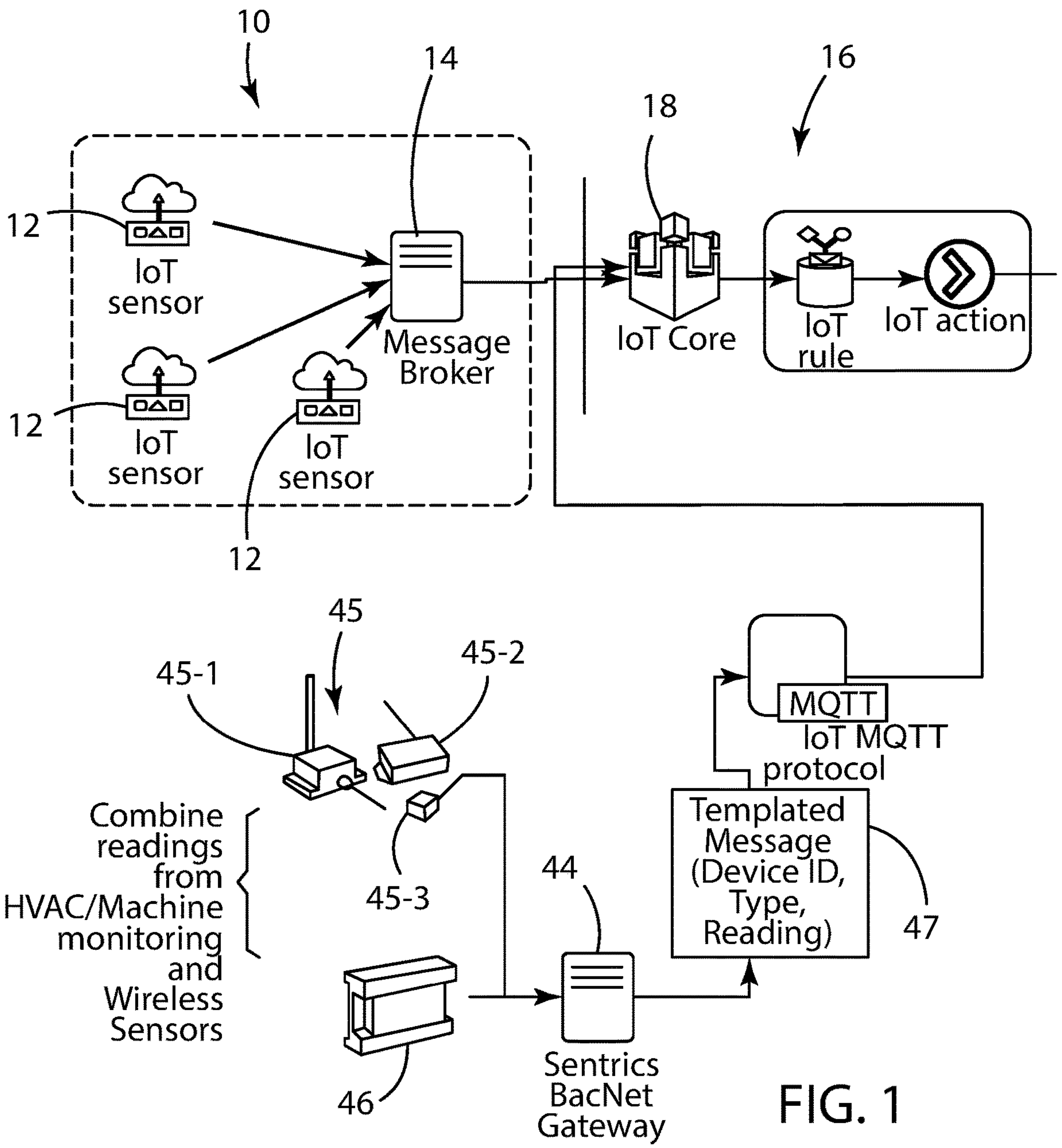
FIG. 1 is a partial diagrammatic view of a predictive monitoring system with gateways communicating with different collections of sensors.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
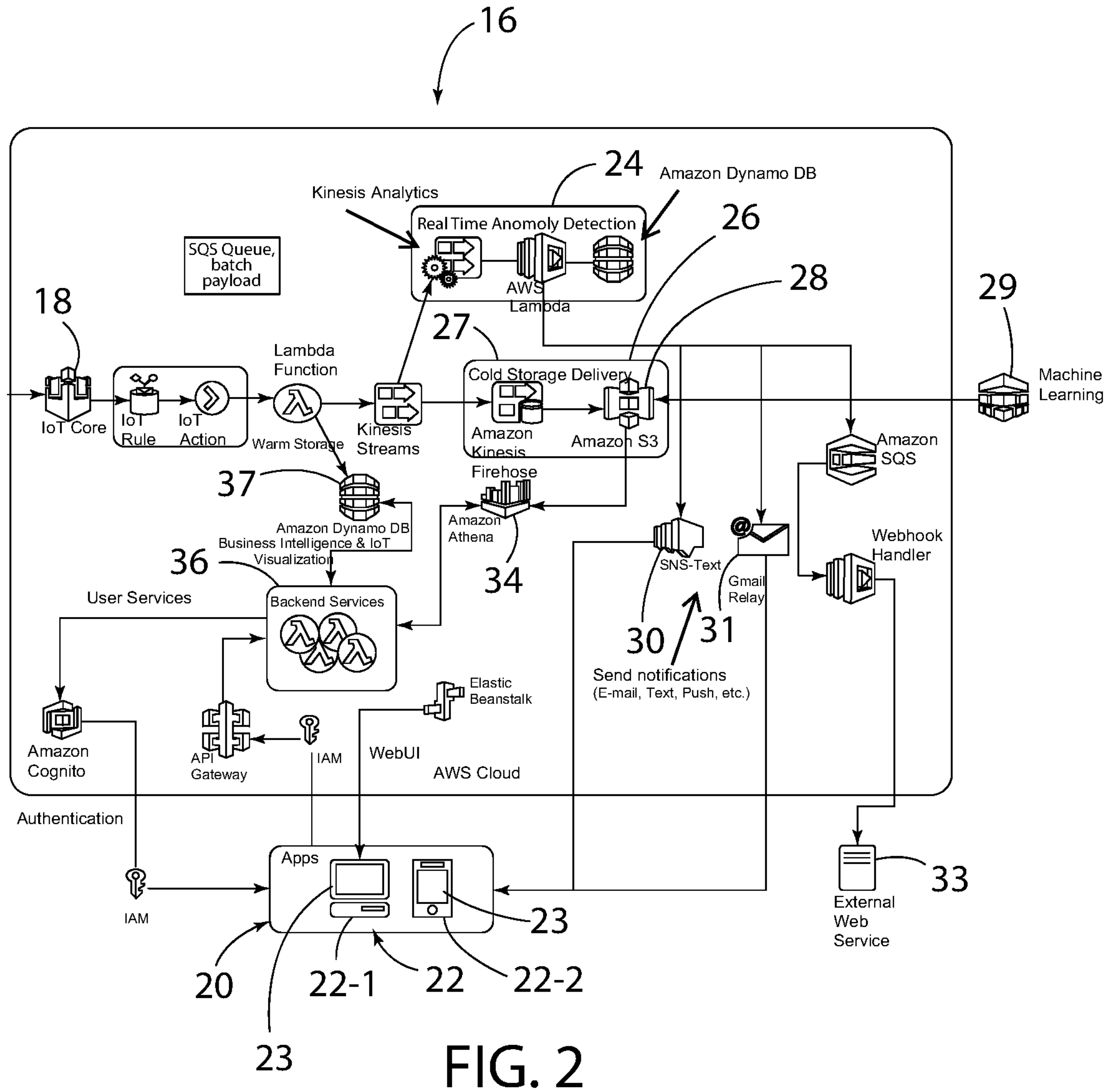
FIG. 2 is a partial diagrammatic view of the predictive monitoring system illustrating a cloud-based processing module for monitoring and analyzing data streams.

Referring to FIGS. 1 and 2, an improved predictive monitoring system or platform 10 (also referenced herein as monitoring system 10) is illustrated, wherein the predictive monitoring system 10 monitors operating conditions in a wide variety of equipment through data collection from at least a first collection of sensors 12. These sensors 12 generally operate using a first type of communications protocol. The sensors 12 are preferably provided on premises in a commercial operating environments such as factories, manufacturing and industrial plants, and the like. Such sensors 12 preferably are IoT type sensors that are installed on equipment or at other locations proximate to the equipment to monitor the operating characteristics of the equipment and/or the external environment around the equipment.

While the commercial operating environment may be a fixed, physical location such as a building, the commercial operating environment might also be a mobile, physical location such as a vehicle including semi-trucks, delivery vans and the like.

The predictive monitoring system 10 also includes an edge gateway 14 and a processing module or subsystem 16, which may be a cloud based computing system but is not so limited. The gateway 14 serves as a message broker and communicates with the processing module 16 to transmit a data stream from each of the sensors 12 to the processing subsystem to perform various predictive and analytic processes on such data as described further below.

Referring to FIGS. 1 and 2, the processing module 16 may be operated with an AWS architecture and use a communications module such as IoTCore 18 to connect to and communicate with the gateway device 14 through a broadband connection or other suitable internet connection. The processing module 16 in turn communicates with a remote control system 20, which comprises a software application or mobile app operated on computer hardware 22 such as a personal computer 22-1 or mobile computing device 22-2. The computer hardware 22 preferably includes a display device 23 such as the monitor on the personal computer 22-1 or display screen on the mobile computing device 22-2.

The processing module 16 includes various sub-modules for performing different functions in processing and analyzing the compiled data stream received from the gateway 14 and generating results that are communicated to the operator through various means including the control device 22. The compiled data stream generally includes the separate, individual data streams received from the individual sensors 12 through the gateway 14. The individual data streams could comprise raw data or could undergo preliminary processing or filtering by the gateway 14.

For example, the sub-modules of the processing module 16 may be performed through various AWS services that are subscribed to and configured to process and analyze the data stream. Such submodules may include, but are not limited to, a real-time anomaly detection module 24 communicating with an AWS Kinesis Streams module 25, and a cold storage delivery module 26 for storing data, which is performed with an Amazon Kinesis Firehose module 27 and an Amazon S3 data storage module 28. A machine learning or other AI module 29 may further process the data and results.

The real-time anomaly detection module 24 may in turn communicate with a text message module 30 and/or e-mail module 31 for communicating results to the control module 20, and/or communicate with an Amazon SQS module 32 that can communicate with an external web service 33.

The processing module 16 may also include an interactive query module 34, such as Amazon Athena for querying the stored data in the cold storage delivery module 26 and generate results therefrom. An additional backend services module 36 may communicate with the control module 20 and query module 34 to display query results on the computer hardware 22. A database service module 37 may also be provided and communicate with the backend services module 36, wherein the database service module 37 may be an Amazon Dynamo DB module to export data for the performance of analytics on the data and for monitoring of data trends.

By the integration of these sub-modules, the processing module 16 analyzes the data streams from the gateway 14 to proactively identify and predict equipment failures before a breakdown or catastrophic failure of the equipment occurs to thereby facilitate repair or replacement of the equipment before an upcoming failure results in secondary damage to other equipment and structures or results in breakdowns that cause operations to be halted. This predictive monitoring system 10 thereby provides for improved industrial operations, which works to avoid costly and damaging repairs and breakdowns.

FIG. 1 also shows the improved predictive monitoring system 10 with an additional gateway 44 that may be configured for receiving different types of data streams using disparate or different communications protocols. The gateway 44 may be configured different from the gateway 14 referenced above. Or the gateway 44 may have multi-protocol functionality so that the gateway 44 can serve as the gateway 14, which is connected to IoT type sensors 12, or may serve as the gateway 44 that is connected to one or more sensor types as described further below.

As illustrated in FIG. 1, the gateway 44 may be connected to one or more sensor types, such as one or more wireless or wired IoT sensors 45 and/or one or more BACNet sensors 46. The IoT type sensor 45 can have several configurations 45-1, 45-2 and 45-3, which may be wired or wireless and installed at selected locations within an operating environment. The sensors 45 may be added separate from the equipment as installed, or may be integrated into the equipment itself such as during the design and manufacture of the equipment. The BACNet sensor 46 also may have different configurations based upon recommended practices for the BACNet communications protocol. For example, the BACNet sensor may be used for HVAC Machine monitoring.

With respect to BACNet monitoring systems or networks, known commercial operating environments may already have sensors configured for a BACNet system such as sensors 46. Therefore, the sensors 46 may form part of an existing BACNet monitoring system, and already be in operation before installation of the IoT type sensors 45 or new equipment incorporating such sensors 45 therein.

As mentioned above, BACNet is a known ANSI/ASHRAE standard that establishes a defined communication protocol that has been used in building systems to allow devices to communicate with each other using a common language. Generally, BACNet has been used to allow systems made by different companies to adopt a common protocol and communicate with each other. BACNet has been used as an industrial and commercial communication protocol by which existing sensors were able to communicate with other devices in industrial and commercial operations. The present invention is thereby configured to integrate into an existing BACNet system or network using the gateway 44 and collects data from the BACNet sensors 46. However, the predictive monitoring system 10 does not rely upon BACNet as its communications protocol but preferably relies upon a communications protocol that is used to operate IoT type sensors such as sensors 45. The BACNet protocol and IoT protocol or other alternate protocol are not the same and work with different hardware to effect communications between system devices.

Further as to FIG. 1, the gateway 44 communicates the data streams received from both the BACNet sensors 46 and IoT sensors 45 as templated messages 47 having a message format that are transmitted through a communications module 48 using an IotT communications protocol such as MQTT or other suitable IoT protocol. Therefore, the predictive monitoring system 10 and gateway 44 may operate as a standalone system when only using IoT type sensors such as sensors 12, and/or may operate as an integrated system tapping into a fully functioning BACNet system by incorporating the gateway 44, which can communicate and transmit separate data streams from both IoT sensors 45 and BACNet sensors 46. With regard to FIG. 1, it will be understood that the sensors 45 and 46 might communicate directly with the gateway 44 or through an intermediary control module that receives the data streams directly and transmits same to the gateway 44 either with or without intermediate processing of the individual data streams generated by the sensors 45 and 46.

With respect to the location of such sensors 45 and 46, many types of equipment may include native sensors built into the equipment, and such data may already be monitored, such as through a BACNet sensor system or network. However, since the development of BACNet years ago, the IoT communications protocol was established, and many modern devices are being marketed with IoT capability. Yet, many older equipment devices are of an age that predates IoT technology. As an advantage of the present invention, the predictive monitoring system 10 allows for the addition of aftermarket sensors having an IoT communications capability, which may be wireless or wired. When wireless, IoT sensors such as sensors 12 and 45 can be installed in a wide variety of fixed and mobile physical locations. The present invention widens the scope of data collection throughout a commercial operating environment to provide a more complete view of critical assets within the operating environment. Further, the present invention allows for data to be collected from both IoT sensors 12 or 45 and existing BACNet type sensors 46. The differences in protocols can be reconciled by the gateway 44 or other system components so that all of the data can be monitored and analyzed as it is collected in real time to detect symptoms or aberrations in operating conditions as recognized in the data collected. The predictive monitoring system 10 allows operators to anticipate and predict future failures or breakdowns, and trigger inspection and repair before such failures or breakdowns occur.

The IoT sensors 12 and 45 can be installed at the time of manufacture as native sensors, or installed later after manufacture as retrofit sensors. When installing non-native or new sensors to equipment as part of the predictive monitoring system, new IoT sensors 12 or 45 may be placed at key areas of the equipment, such as motors and piping in the case of a pump, with the goal to collect information, understand operating behaviors of the equipment, and leverage the information with the predictive monitoring system to proactively initiate maintenance to avoid potential failures. The sensors 12, 45 or 46 may be of a variety types detecting different types of data such as temperature, vibrations, pressure, power consumption and the like. These sensors 12, 45 or 46 thereby generate a stream of data of different formats that the predictive monitoring system 10 is able to monitor and is able differentiate one data type from another and then present results to a system operator through the control device 20. The predictive monitoring systems 10 interprets the data for the operator and flags data trends that deviate from normal trends and thereby are indicative of an equipment problem and displays these results using the software of mobile app, which displays the results on the computing device 20. Further, the computing device 20 allows the operator to query, graph and display data results, trends and equipment warnings.

The predictive monitoring system 10 generates the timely, data-driven insights required to enable the most effective actions and optimize operational efficiency of the equipment. The IoT sensors 12 and 45 provide for sensor compatibility via open-standards and may incorporate communications protocols different from IoT standards. Further the gateway 44 integrates and reconciles differences in the data streams received in the BACNet communications protocol. The system 10 further provides cloud managed storage for all sensor readings with intuitive and configurable sensor tagging, real-time single and multi-sensor analytics, API connectivity to more acquired data sources, visualization of data, trends, and other outputs, and configurable text, email, and API enabled alerts.

Figure 3:
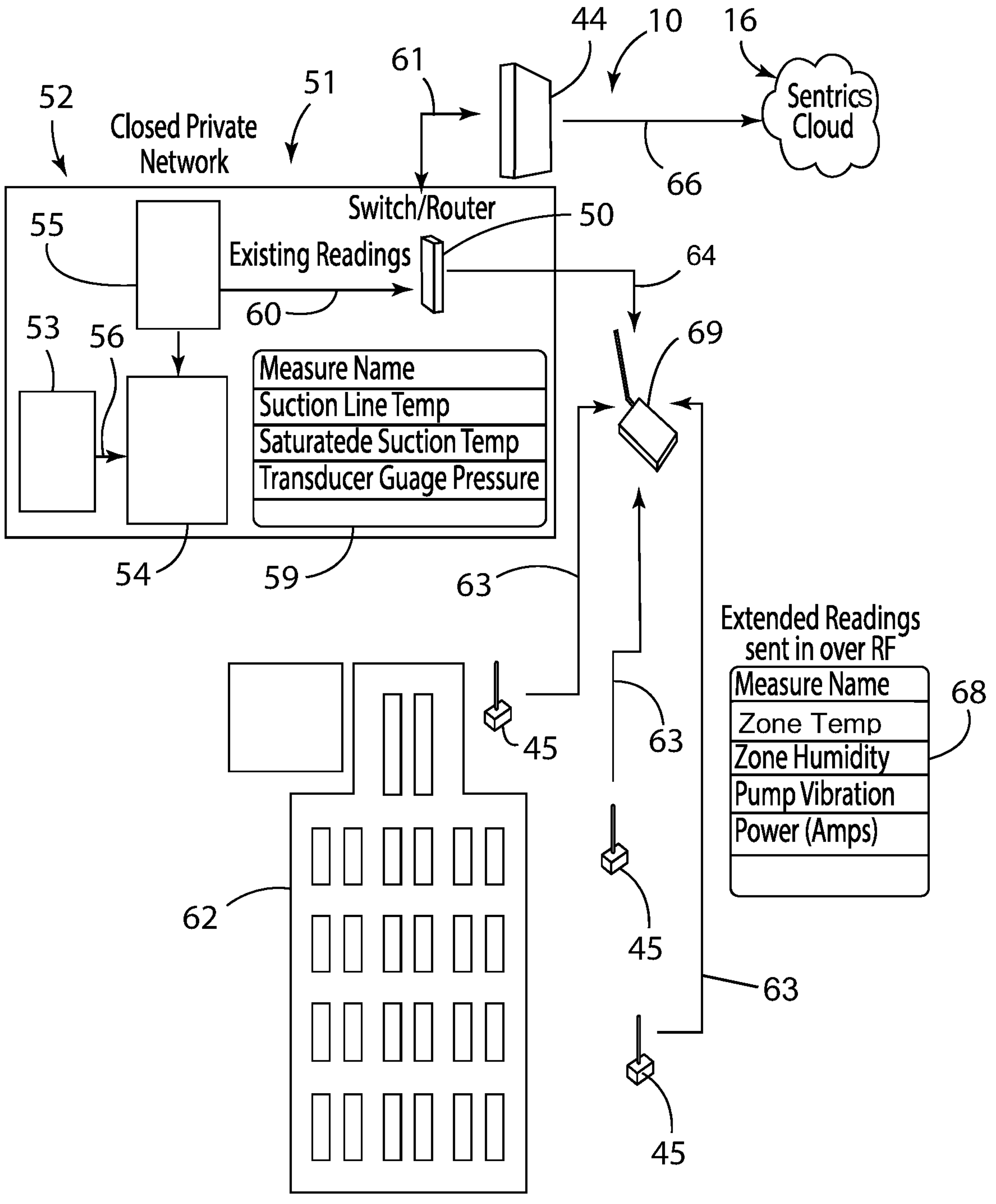
FIG. 3 illustrates additional details of the on-site components of the predictive monitoring system.

Referring to FIG. 3, a more detailed embodiment of the predictive monitoring system is illustrated, which incorporates the features described previously relative to FIGS. 1 and 2. Generally, the processing module 16 is identified diagrammatically as cloud processing and further discussion is not required herein. The gateway 44 is shown in communication with a router 50 that directs data streams to the gateway 44.

An existing BACNet network 51 is shown, which is conventionally configured as a closed private network. An operating environment 52 is generally shown, which comprises various equipment 53, which operate in this environment. The equipment 53 generally includes one or more BACNet sensors 46 that communicate through a network component 54 to a BACNet controller 55. While the BACNet sensors 46 can communicate data to the BACNet controller 55, the BACNet network 51 provides two way communication between the equipment 53 and the BACNet controller 55 so that the controller 55 can monitor the sensor signals 56 and in return, send control signals 57 to the equipment. The illustrated configuration is diagrammatic and simplified but an actual BACNet network 51 may be complex and use the BACNet protocol to uniquely format the data signals and control signals for building and equipment operation.

A representative sample for the BACNet data format of the data fields present in the BACNet signals is shown in box 59, wherein a variety of measure names, field names and other naming conventions can be established for each sensor signal or device and then data collected and transmitted for selected variables, such as temperature, speed, vibrations and the like.

The improved predictive monitoring system 10 is also connected in communication with the BACNet controller 55 to access the data signals received through the BACNet network 51. These BACNet data signals are monitored and collected without interfering with the normal and intended operation of the BACNet network 51 at the time of data collection. The gateway 44 reads data from BACNet Controller 55 through the data stream 60 sent to the switch/router 50 and then communicated to the gateway 44 through the data stream 61. Therefore, the gateway 44 and switch/router 50 can be added to an existing BACNet Network 51 to tap into the data stream without disturbing the preestablished structure and function of the BACNet network 51.

As described relative to FIGS. 1 and 2, the gateway 44 may also receive data streams of IoT sensor signals from the IoT sensors 45. As noted above, the sensors 45 may be added at various locations within a building 62 or other physical location such as a vehicle. If wireless, the IoT sensors 45 can transmit each of the IoT data streams 63 through wireless signals (also indicated by reference numeral 63) to an access point 64 and in turn communicate these sensor data streams to the switch/router 50 through data stream 65. The switch/router 50 can in turn forward the data streams 60 and 65 as a combined data stream 61 to the gateway 44. The combined data stream 61 may typically include component data streams for each sensor being monitored by the gateway 44 so that individual sensor data can be analyzed and processed.

The gateway 44 in turn feeds a combined data stream 66 to the processing module 16 via an existing endpoint. As such, the monitoring system 10 makes use of the data available from a traditional, closed loop network, such as the BACNet network 51 and data available from the different sensors in the IoT system in an add-on or retrofit sensor configuration different from the BACNet network 51. The processing module 16 can then combine various sensor readings from different types of sensors and networks into one view on the control device 20.

The data streams 63 may comprise data fields differing in form, labels and contact in comparison to the representative BACNet data described relative to box 59. In FIG. 3, a representative sample for the IoT data format of the data fields present in the sensor signals 63 is shown in box 68, wherein a variety of measure names, field names and other naming conventions can be established for each sensor signal or device and then data collected and transmitted for selected variables, such as zone temp, zone humidity, device vibration, power (Amps), and the like. This data is formatted and labelled differently from the BACNet data, wherein the predictive monitoring system 10 then reconciles and coverts the data to conform to the system communications protocol such as that used for the IoT sensors 45.

Figure 4A:
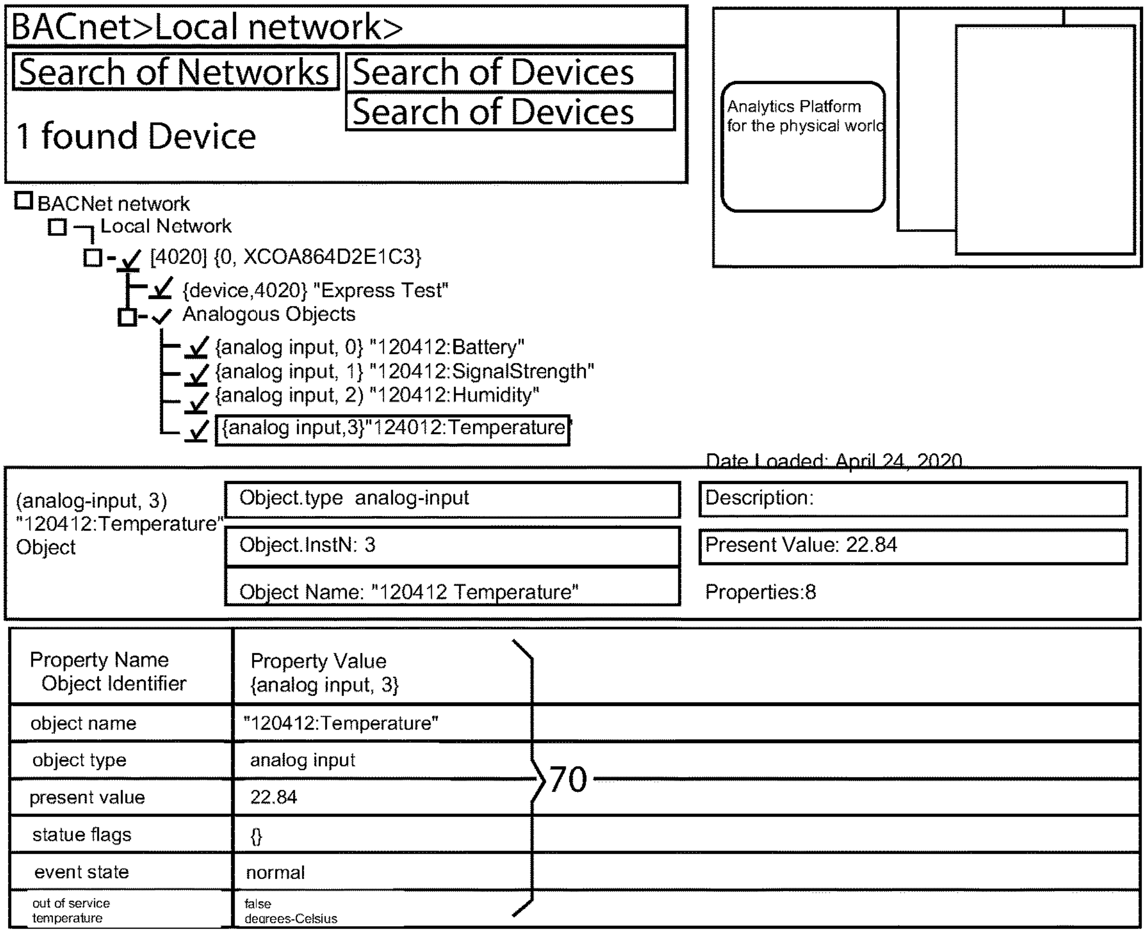
FIG. 4A illustrates a sensor data screen for a BACNet network.

Refer ring to FIG. 4A, representative sensor data is illustrated in a display screen 69 for a temperature sensor on a BACNet network 51. The BACNet protocol has particular defined data identifiers 70, which generally may include an object identifier, object name, object type, present value, flags, event state, service state and units. Multiple sensor objects would be identifiable on the BACNet network 51. The gateway 44 or other system component of the predictive monitoring system 10 than can receive the data identifiers and convert same to a new format as used by the predictive monitoring system 10. Since the predictive monitoring system 10 taps into the BACNet network 51, the inventive system 10 does not alter operation of the BACNet network 51.

Figure 4B:
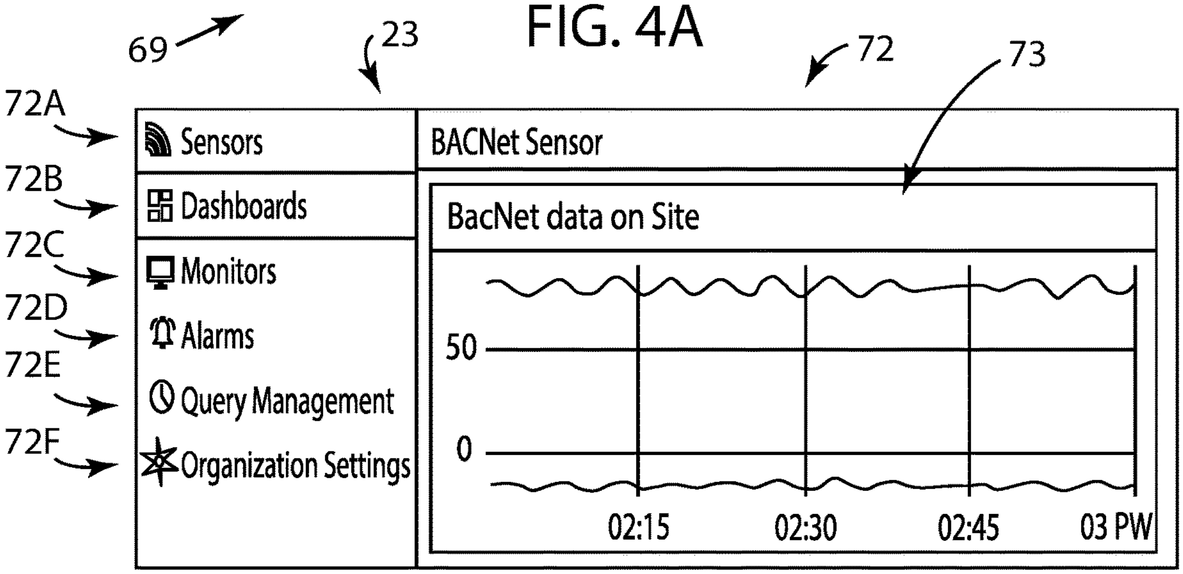
FIG. 4B illustrates a display screen for managing data and reviewing results.

FIG. 4B illustrates one example of a graphical user interface (GUI) 72 for the control system as may be displayed on the display device 23 in a display area 73. The system software may include clickable buttons on the GUI 72 relating to system modules for viewing or accessing Sensors 72A, Dashboards 72B, Monitors 72C, Alarms 72D, Query Management 72E and Organization Settings 72F.

In one exemplary system, the predictive monitoring system 10 may implement advanced monitoring and analytics to a combined set of data from both BACNet and wireless temperature and humidity sensors. The BACNet subnetwork may incorporate a network of BACNet hardware and routers commercially available from Contemporary Controls Systems, Inc., wherein the BACNet hardware and routers may be configured for continual readings, such as in a cold storage warehouse, to supply a BACNet data stream to a respective gateway, such as gateway 44. The gateway 44 may also receive a data stream for each individual sensor, whether wired or wireless, using a different communications protocol in comparison to the BACNet communications protocol. The system 10 may monitor and detect temperature and humidity spikes which would cause strain on a cooling system. The system 10 may be configured to receive multivariable readings at high intervals (1 second) for internal readings and lower intervals (1 minute) for external readings. Further, the BACNet network may be configured to perform an array of control systems such as multiple freezer/fridge Control Systems in a freezer and refrigerator cold warehouse setting. The predictive monitoring system 10 would be able to visualize and monitor conditions and respond within a small window (such as 5 seconds) to offer an immediate action/alert for that condition. As such, the predictive monitoring system 10 platform can ingest and perform monitoring capabilities of a mixed set of sensors with different characteristics in terms of sensor type, shape of data and the protocol used. The BACNet network 51 does not require any significant modifications, and installation can be accomplished with minimal setup time and costs, wherein no added code or adapters are required other than those components described above and the network configuration can be specific to the BACNet platform already in place.

Figure 5:
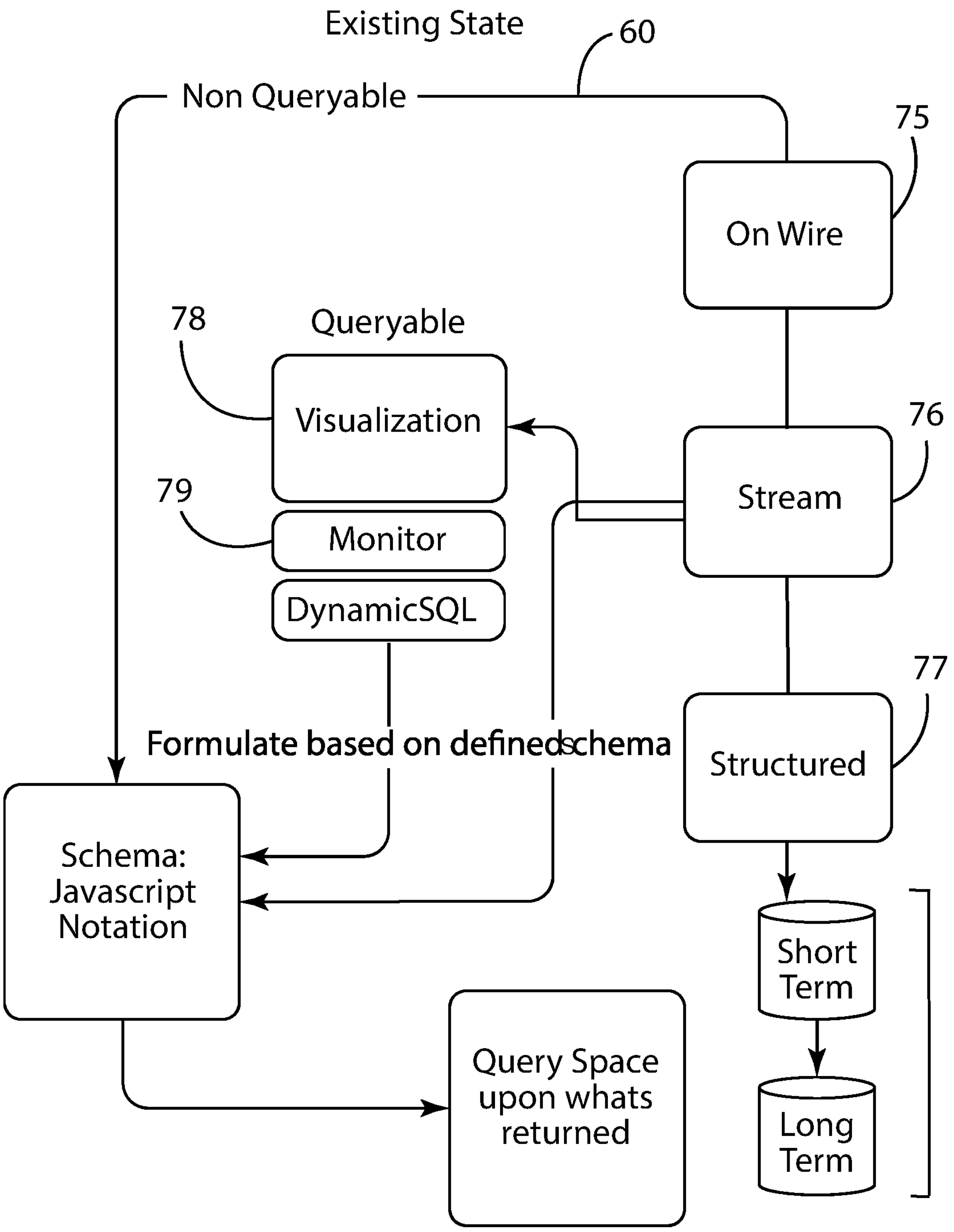
FIG. 5 is a flowchart showing the processing steps for the data stream.

Referring to FIG. 5, a typical BACNet design may include a basic appliance with two ethernet network connections or ports: one public, one private network. The predictive monitoring system 10 may then tap into the BACNet network 51 such as by the switch/router 50 and gateway 44 that can connect to one of the existing BACNet network connections or ports, typically on the public port. Therefore, the BACNet network 51 can remain a closed private network but the BACNet data can be accessed by through the gateway 44.

The BACNet data can be started on network devices and the data streams directed to the direct to the BACNet controller 55. The router 50 and connected gateway 44 can be collocated with software that receives sensor signals, such as by a proprietary 900 MhZ wireless signal from the wireless devices 45, to listen for these device, and receives the BACNet stack 60 from the BACNet controller 55 for listening for other devices, such as the BACNet devices.

The inventive system can then discover devices which match type (Type=85), and periodically transmit via MQTT to queue (2 second intervals), for example as shown in FIG. 1. The predictive monitoring system 10 needs to know only the gateway ID (the appliance) and can discover any number of devices that are transmitting data signals. The predictive monitoring system 10 then feeds readings along with other readings to the processing module 16 for monitoring of the data signals 66. The monitored data signals 66 can include BACNet readings along with wireless sensor readings in the non-BACNet protocol. The processing module 16 of the predictive monitoring system 10 then provides the capabilities for dashboarding, monitoring, visualizing and compliance reporting.

In more detail as to the processing of the data streams 61, the gateway 44 or other system component can perform initial, on wire processing step 75, wherein the raw data stream 61 is initially non-queryable for the BACNet data stream 60. However, by gateway 44 or other system component, initial data processing can be performed initially on the combined data stream 61 to evaluate, identify and discard unrecognized, unregistered or non-secure data immediately before transmission to the processing module 16 as data stream 66, which thereby saves downstream processing and reduces the downstream data stream 66 to that desired data embedded with the upstream data streams 60 and 65 that is desirable for downstream for analysis.

The data stream 66 can be transformed through stream handling 76 with schema by the gateway 44 or processing module 16, which allows building of dynamic queries load balanced to optimize with organization awareness. Load balancing preferably is included as part of the SQL definition. With schema projection, this provides the ability to apply a single definition to all areas of the product by processing and reconciling the different data streams 60 and 65 and allows for stream handling 76 to redirect to structured dtable 77, visualization 78 and monitoring 79 through the processing module 16. This data handling presents the user with queryable fields. No predefined rules are needed, but only labels that are assigned that tell the system which individual sensor readings are required. These labels and the lack of predefined rules can span an unlimited number of sensor types (i.e., manufacturers).

Further, the analytical apps of the processing module 16 can create SQL statements using the defined schema. The schema allows for awareness of an organization and optimizes the data stream to reduce the number of total SQL statements, which can be an expensive part of monitoring at subsecond level. As a result, the processing of data stream 61 provides a consistent uniform way to access data without including the portions of the data that are not relevant to the query fields. What is filtered in comes from a union of the sensors configured with the sensor schema. This allows the system to create uniform and consistent query without the need to index or combine tables with the data. This also incorporates structured data queries and structured data (normalize, module/modularize). The structured data can also provide for both short term or warm reporting (such as the latest 30 days of data) or long term data for historical data beyond 30 days).

Figure 6:
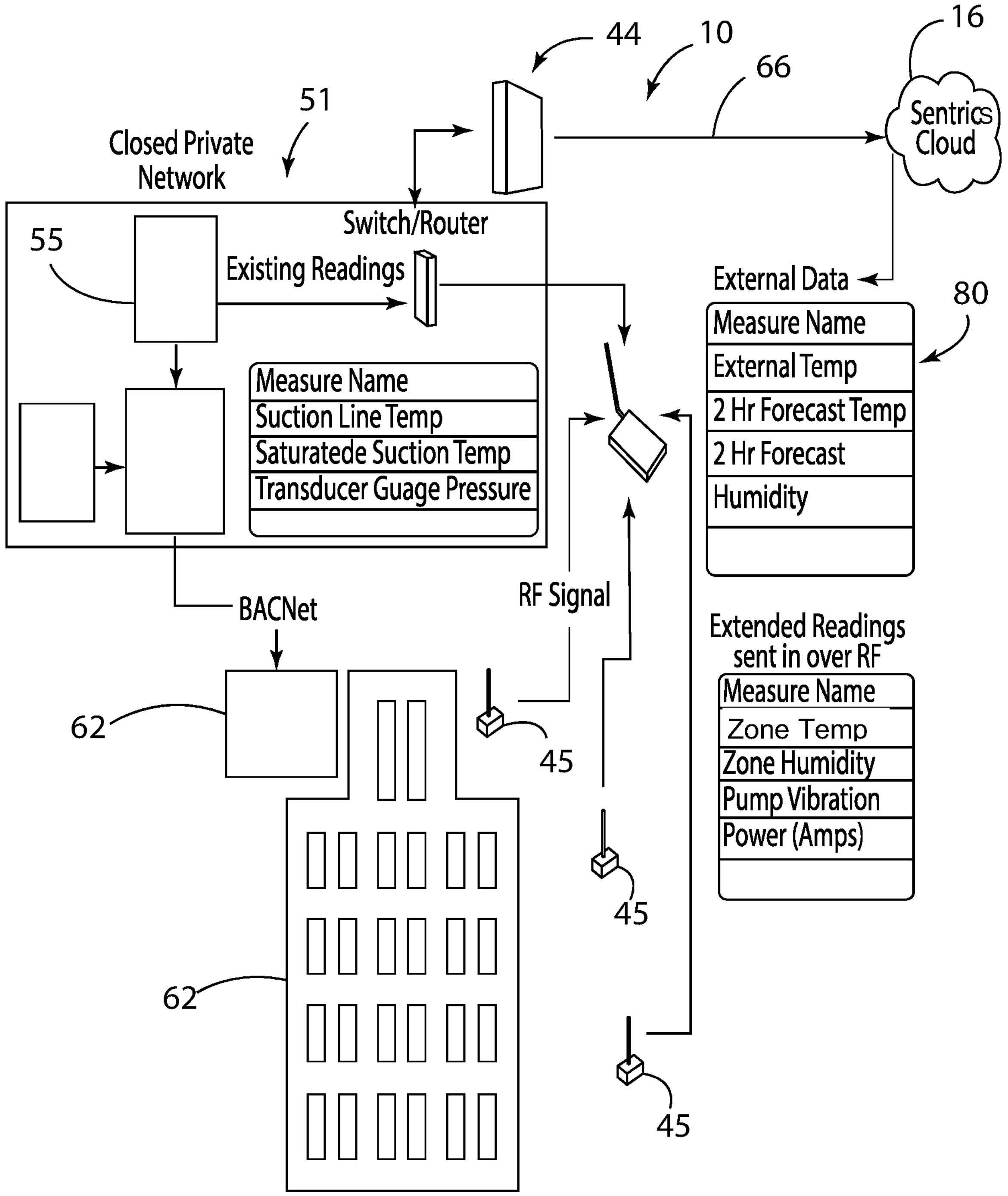
FIG. 6 illustrates an alternative configuration of the onside components of the predictive monitoring system.

Further, the processing module services such as Athena services can be used to generate schema and project in order to monitor underlying data, wherein the monitor can be detached just as easily without duplicating any data in the tables Referring to FIG. 6, the predictive monitoring system 10 may be configured to also include external data such as that shown in block 80. The external data might also include other data sources or sensors that provide data for external humidity, external temperature, and 2 hour forecasts for temp and humidity. These are representative variables and other variables may also be monitored. The gateway 44 reads data from BACNet Controller of the BACNet network 51 and the other sensors 45 and the gateway 44, wherein the gateway 44 feeds the data stream 66 to blockchain via an existing endpoint for use by the processing module 16. As an advantage, the various types of data are available for the traditional, closed loop BACNet network 51 and for cloud based engines like the predictive monitoring system 10, which allows for the combination of various sensor readings into one view on the system monitor 23 (FIG. 2).

In one potential configuration, the gateway 44 preferably does not sit on the BACNet network 51. Although there might be an advantage in incorporating the gateway 44 as part of the BACNet network 51 since the information is directly available to other devices on BACNet side. However, to avoid network collisions, the gateway 44 preferably does not sit on the same network as the equipment network 51 and relies upon a network connection as described above. In this case, the appliance, i.e., the gateway 44 does the bridging, and can combine both data sets from different data streams such as 60 and 65 and can then push the data stream 66 up to processing side of the predictive modelling system 10. When combined with other systems gateways, cellular gateways, etc., the predictive monitoring system 10 can further broaden the sensors to monitor.

In some embodiments, the predictive monitoring system 10 may include adapter integration, which uses ticketing based on monitoring actions. Based upon a pre-existing trigger, the predictive monitoring system 10 may identify an added event that creates a ticket in a ticket tracking system (i.e., JIRA Service Desk). The schema definitions determine qualities/environmental settings at the time of an incident and a graph may be generated of the data trend at this time. An adapter may be installed by the software that requires authentication and organization project name and login credentials. Upon configuration, this is assigned as a configuration option within the organization monitors for a particular organization using the monitoring system 10. This configuration is then held by the predictive monitoring system 10 and kept separate from other groups. Severity and organization settings may be applied and carried into a ticket. A redline threshold may be set on the graph, which increases severity when it moves from warning to alert. Context is generated by including data gathered at the time of incident, around the sensor which triggered the problem. A user can then further refine the series of actions needed to resolve the ticket. This process flow is defined outside of the predictive monitoring system 10, as to allow greater capability and utilization of existing systems, without having to use the predictive monitoring system 10 for all aspects of ticketing. The predictive monitoring system 10 continues with specialization for early warning and detection, while relaying only key elements of the incident.

The predictive modelling system 10 may also provide for predictive modelling incorporating additional functionality. A a series of predictive models may be incorporated which may be adjusted using a Machine Learning Model optimized to meet the training period for the condition. For example, this modelling might be particularly geared towards cold storage warehouses. In such an example, faulty equipment generates many alerts, but advanced warning is the key in preserving cold products. Based on internal factors (device type of sensor), time of day (by timestamp), percent change and previous measurement (in Celsius), a predictive model can determine if a failure was imminent such as within the next two time intervals (15 minutes each). Exemplary model types may include a LGBMClassifierEstimator for detecting freezer breaches and a P4 GradientBoostingClassifier for conditions around a refrigeration alert. The predictive monitoring system 10 utilizes existing structures to frequently poll the model and look for a response (prediction=0 means no breach, prediction=1). Using a modelled probability or a percent confidence level, the user can further refine the alerts and notify users prior to an actual breach. This allows the user lead time to anticipate an equipment failure before such occurs.

Further, the model can be trained with external conditions that were found to cause an adverse effect on the machinery. For example, training may incorporate the theory that a significant increase in humidity can create a harsh environment for their HVAC system.

From a user perspective, this modelling option is shown in the predictive modelling system 10 as a "virtual predictive sensor" that behaves the same way as a traditional sensor, wherein the user can adjust and set alarms around the prediction value and probability The predictive modelling system 10 may provide for auto registration and layout variability. If the predictive monitoring system 10 knows a client ID (defined at a high level as a network endpoint that can have many sensors), the system 10 is in a position to automatically add sensors to the list without any user intervention. This feature is useful for scenarios like BACNet where registration and configuration happens outside the predictive monitoring system 10. This feature may be configurable and can be turned off. In further detail, the sensor layouts (one of the main software screens) can be set to use a list (a flat layout), a tree (a layout that shows hierarchy or site related information, or a map (a vector of where the sensors are located by latitude, longitude). This is customizable and presented differently on mobile devices in a more concise mode.

In more detail as to the handling of the data streams, the following summarizes the process:

the gateway 44 or other appliance has a catalogue of device types (which may be characterized as the predictive monitoring system registry) mapped to that object type, number and label that is exposed on the BACNet side. Example being temp and humidity, but these are examples and can be extended to an unlimited list (air quality, voltage, etc.);

BACNet network and devices are configured with well formatted input labels;

the gateway 44 begins listening to each of those, and assigns a unique number or other identifier to translate to a unique sensor for the predictive monitoring system 10;

BACNet listener in the gateway 44 or other appliance queries for readings on its own (generally slower) frequency, as defined by the predictive monitoring system 10, as opposed to the high update frequencies that may exist in a typical BACNet network;

BACNet listener also taps into the other network to listen for specific devices on RF gateway side, such as the sensors 45; and the gateway 44 or other appliance transmits both messages from the BACNet and other device side over a public connection (this can be a third network in some cases) such as by transmitting the data stream 66 as described above. The data stream 66 may be received by the processing module 16 on the cloud side of the predictive monitoring system 10. Notably the processing module 16 may be serving multiple different organizations.

On the cloud side, the device type may tell the processing module or platform 16 what the sensor reading is and where to send it (what organization). It may use a ClientId and device type to do this (that can only be assigned to one organization), and processing may include the following features:

Automatic registration of the device type and ClientId allows for these to appear without redoing what has been done on the BACNet side;

Upon error (mismatch of type) the administrator is notified and can optionally add the missing device type; and Using this format, the information can be compared with any other set of sensors, ingested for the following purposes.

The predictive modelling system 10 may further provide additional functionality as follows:

1. Monitoring—Rule based using a set of rules, including multiple variable conditions across other sensors or groups.
2. Monitoring—Predictive using a virtual sensor wherein information triggers machine learning model and is displayed alongside other sensor readings. Or a trigger may be setup.
3. Visualization (in a chart with any other sensor in the viewable organization) and queries for audit compliance purposes.

The predictive monitoring system 10 can trigger another operation based on the conditions from the monitors, invoking a command to trigger some action.

With the inventive monitoring system 10, the BACNet sensor data streams are processed but remain in a traditional form for use in a closed loop network, and in a processed form for cloud based engines. The present invention therefore relates to an improved predictive monitoring system 10 and an integrative subsystem installed in a BACNet environment and connected to other components of the predictive monitoring system 10 that allows the predictive monitoring system to both communicate with IoT devices as originally designed and also integrate with existing BACNet devices to receive data streams from all of these devices and reconcile the differences in the communications protocols for use with the predictive monitoring system.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A predictive monitoring system configured to both communicate with IoT devices and also communicate with BACNet devices to receive data streams from said IoT and BACNet devices associated with operating equipment and reconcile differences in communications protocols so that data is usable with said predictive monitoring system for monitoring commercial equipment in a BACNet environment, said predictive monitoring system comprising:

a processing module or subsystem for data processing, analytics and communication of data trends and alert conditions, said processing module including an IoT core configured to receive streams of data formatted in an IoT protocol;

a first edge gateway communicating with said processing module and connected to a first plurality of IoT sensors to receive an IoT data stream from each of said IoT sensors by a first communication protocol and transmit said IoT data streams to said processing module to perform various predictive and analytic processes on said data; and a second edge gateway configured for receiving one or more BACNet data streams from a second plurality of sensors configured as BACNet sensors, which use a BACNet protocol that defines a second communications protocol that is disparate or different in comparison to said first communications protocol of said first plurality of sensors, said IoT protocol and said BACNet protocol being incompatible with each other, said second gateway either being configured different from said first gateway to handle only said second communication protocol, or being configured to handle multiple communications protocols to communicate with both said IoT sensors and said BACNet sensors communicating with said first and second communication protocols, wherein said second edge gateway is configured to receive and process said BACNet data streams in said second communications protocol and thereby convert said BACNet data streams from said second communications protocol to said first protocol and generate converted data streams corresponding to said BACNet devices, wherein said converted data streams for said BACNet devices use said first communications protocol and are transmitted to said processing module, said second communications protocol of said BACNet data streams being converted to said first communications protocol by reformatting, relabeling, reconciling and converting data fields and associated data, wherein said second edge gateway is configured to further process any of said IoT data streams and any of said BACNet data streams received thereby to evaluate, identify and discard any unrecognized, unregistered or non-secured data before transmission to said processing module as said converted data streams; and said predictive monitoring system being configured to use said first communications protocol used by said first gateway, wherein said second edge gateway transforms said data stream of said second communications protocol to a data stream usable by said predictive monitoring system, said predictive monitoring system being configured to receive both said IoT data streams and said converted data streams, which define a combined data stream, and to identify each of said IoT and BACNet device transmitting respective data as any of said IoT data stream or converted data stream forming a part of said combined data stream; and said processing module comprising:

an IoT core configured to receive said combined data stream;

an anomaly detection module receiving said combined data stream from said IoT core and analyzing said combined data stream to monitor each of said IoT and BACNet devices and predictively identify any anomalies therewith; and a system display for displaying data for each of said IoT and BACNet devices and any anomalies associated therewith.

2. The predictive monitoring system according to claim 1, wherein said predictive monitoring system monitors operating conditions of a wide variety of equipment through data collection from at least said first plurality of sensors, while optionally being connected to said second gateway to collect data from said second plurality of sensors.

3. The predictive monitoring system according to claim 1, wherein said sensors are provided on premises in a commercial operating environments.

4. The predictive monitoring system according to claim 1, wherein said first plurality of sensors are IoT type sensors using the IoT protocol as said first communications protocol that are installed on equipment or at other locations proximate the equipment to monitor the operating characteristics of the equipment and/or the external environment around the equipment.

5. The predictive monitoring system according to claim 4, wherein said commercial operating environment may be a fixed, physical location such as a building, the commercial operating environment might also be a mobile, physical location such as a vehicle including semi-trucks, delivery vans and the like.

6. The predictive monitoring system according to claim 1, wherein said processing module is configured as a cloud based computing system.

7. The predictive monitoring system according to claim 1, wherein said processing module uses an AWS architecture for said data processing, analytics and communication of data trends and alert conditions.

8. The predictive monitoring system according to claim 1, wherein differences in said first and second communications protocols can be reconciled by said second gateway or other system components so that all of the data can be monitored and analyzed as it is collected in real time to detect aberrations in operating conditions that might indicate a potential failure.

9. The predictive monitoring system according to claim 1, wherein said predictive monitoring system allows operators to anticipate and predict future failures or breakdowns, and trigger inspection and repair before such failures or breakdowns occur.

10. A predictive monitoring system configured to both communicate with IoT devices and with BACNet devices that monitor operating equipment to thereby receive respective data streams from said IT and BACNet devices and to reconcile differences in communications protocols used by said IoT devices and said BACNet devices so that data is usable with said predictive monitoring system for monitoring commercial equipment in a BACNet environment, said predictive monitoring system comprising:

a processing module configured to perform data processing, analytics and communication of data trends and alert conditions for said operating equipment based upon data obtained from a first plurality of said IoT devices, which are each configured as IoT sensors which each generate an IoT data stream and communicate said IoT data stream by a first communications protocol, and a second plurality of BACNet devices, which are each configured as BACNet sensors, which use a BACNet protocol to generate a BACNet data stream and communicate said BACNet data stream by a second communications protocol;

an edge gateway configured to communicate with said processing module and communicate with said IoT sensors to receive said IoT data stream from each of said IoT devices configured as said IoT sensors by said first communication protocol and transmit said IoT data streams to said processing module using said first communications protocol;

said edge gateway further configured to communicate with said BACNet sensors to receive said BACNet data streams, which use said BACNet protocol that defines said second communications protocol, wherein said second communications protocol is different in comparison to said first communications protocol of said IoT sensors, said edge gateway being configured to handle multiple communications protocols to communicate with both said first communications protocol of said IoT sensors and said second communications protocol of said BACNet sensors, wherein said edge gateway is configured to receive and process said BACNet data streams and thereby convert said BACNet data streams from said second communications protocol to said first protocol and generate converted data streams for said BACNet devices that use said first communication protocol and are transmitted to said processing module as said converted data streams; and said processing module of said predictive monitoring system being configured to receive and use a combined data stream comprising said IoT data streams of said first communications protocol and said BACNet data streams after conversion to said converted data streams wherein said combined data stream is received and used by said processing module of said predictive monitoring system, said predictive monitoring system being configured to identify each said IoT and BACNet device transmitting respective data as any of said IoT data stream or converted data stream forming a part of the combined data stream; and said processing module comprising:

an IoT core configured to receive said combined data stream;

an anomaly detection module receiving said combined data stream from said IoT core and analyzing said combined data stream to monitor each of said IoT and BACNet devices and predictively identify any anomalies therewith; and a system display for displaying data for each of said IoT and BACNet devices and any of said anomalies associated therewith.

11. The predictive monitoring system according to claim 10, wherein said processing module monitors operating conditions of a wide variety of said operating equipment each being respectively monitored by at least one of said IoT sensors and said BACNet sensors through data collection from said IoT sensors and said BACNet sensors, wherein said processing module receives said combined data which solely uses said first communications protocol.

12. The predictive monitoring system according to claim 10, wherein said IoT sensors use an IoT protocol as said first communications protocol and are installed directly on said operating equipment or at other locations proximate the operating equipment to monitor operating characteristics of said operating equipment and/or external environment around said operating equipment.

13. The predictive monitoring system according to claim 10, wherein said processing module is configured as a cloud based computing system.

14. The predictive monitoring system according to claim 10, wherein differences in said first and second communications protocols are reconciled by said edge gateway so that all of the data of the combined data stream received by said processing module from said edge gateway is monitored and analyzed as it is collected in real time to detect aberrations in operating conditions indicative of a potential failure.

15. The predictive monitoring system according to claim 10, wherein said second edge gateway is configured to further process any of said IoT data streams and any of said BACNet data streams received thereby to evaluate, identify and discard any unrecognized, unregistered or non-secured data before transmission to said IoT core.

16. A predictive monitoring system configured with the capability to communicate with IoT devices and with BACNet devices, which are configured to monitor operating equipment, to receive respective data streams from said IoT and BACNet devices and to reconcile differences in communications protocols used by said IoT and BACNet devices so that data is usable with said predictive monitoring system for monitoring commercial equipment in a BACNet environment, said predictive monitoring system comprising:

a processing module configured to perform data processing, analytics and communication of data trends and alert conditions for said operating equipment based upon data that can be obtained from a first plurality of said IoT devices, which are each configured as IoT sensors which each generate an IoT data stream and communicate said IoT data stream by a first communications protocol, and a second plurality of BACNet devices, which are each configured as BACNet sensors, which each use a BACNet protocol to generate a BACNet data stream and communicate said BACNet data stream by a second communications protocol;

a first edge gateway configured to communicate with said processing module and with said IoT sensors to receive said IoT data stream from each of said IoT sensors by said first communications protocol and transmit data to said processing module using said first communication protocol for said IoT data streams;

a second edge gateway configured for receiving said BACNet data streams from said BACNet sensors, which use said second communications protocol that is different in comparison to said first communications protocol, said second edge gateway being configured to receive and process said BACNet data streams and thereby convert said BACNet data streams from said second communications protocol to said first protocol to generate converted data streams for said BACNet devices using said first communications protocol, said second communications protocol of said BACNet data streams being converted to said first communications protocol by reformatting, relabeling, reconciling and converting data fields and associated data, wherein said second edge gateway is configured to further process any of said IoT data streams and any of said BACNet data streams received thereby to evaluate, identify and discard any unrecognized, unregistered or non-secured data before transmission to said processing module;

said processing module of said predictive monitoring system including an IoT core configured to receive and transmit a combined data stream comprised of each of said IoT data stream of said first communications protocol used by said first gateway and said converted data streams of said first communications protocol; and at least one processing sub-module receiving said combined data stream from said IoT core for performing at least one function of said data processing, analytics and communication of data trends and alert conditions performed by said processing module.

17. The predictive monitoring system according to claim 16, wherein said second gateway is configured to handle multiple communications protocols to receive both of said IT data streams of said first communications protocol for said IoT sensors and said BACNet data streams of said second communications protocol for said BACNet sensors, convert said BACNet data streams to said converted data streams, and communicate said IoT data streams without modification and said converted data streams to said IoT core of said processing module as templated messages using said first communications protocol.

18. The predictive monitoring system according to claim 17, wherein said at least one processing sub-module comprises a plurality of said processing sub-modules which respectively perform said data processing, said analytics and said communication of data trends and alert conditions.

19. The predictive monitoring system according to claim 18, wherein each of said processing sub-modules communicates respective results to a remote control system.

20. The predictive monitoring system according to claim 17, wherein said second edge gateway is connectable to a network connection of a closed loop BACNet network comprising said BACNet sensors that monitor the operating equipment, a BACNet controller that controls the operating equipment based upon said BACNet data streams, which communicate between the BACNet sensors and said BACNet controller, said second edge gateway being configured to tap into said BACNet data streams for use by said predictive monitoring system.

* * * * *